April 27, 1943.                M. DUCKSTEIN                2,317,745
            LUBRICATING DEVICE FOR AIRCRAFT ENGINES
                        Filed March 2, 1940
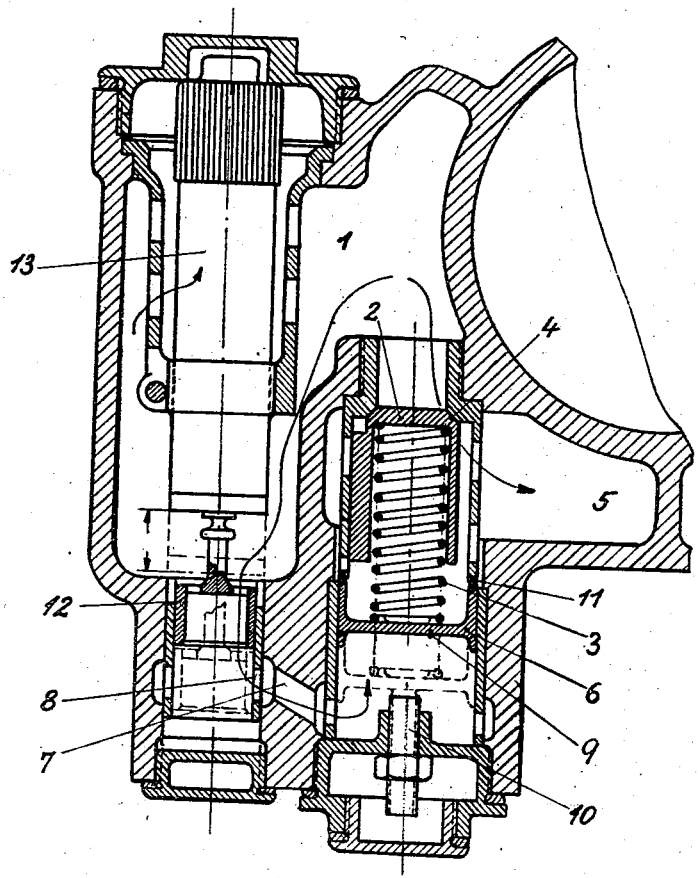
INVENTOR:
MARTIN DUCKSTEIN
by
ATTORNEYS Patented Apr. 27, 1943

2,317,745

UNITED STATES PATENT OFFICE 2,317,745

LUBRICATING DEVICE FOR AIRCRAFT ENGINES

Martin Duckstein, Munich, Obermenzing, Germany; vested in the Alien Property Custodian Application March 2, 1940, Serial No. 321,814
In Germany March 3, 1939

7 Claims. (Cl. 123—196)

This invention relates to lubricating devices for aircraft engines, being designed to supply all parts to be lubricated with a proper quantity of oil immediately after starting, so that the engines can be loaded fully without delay. As is known, cold and viscous oil passes the cross-sectional passage areas of the pipes dimensioned for normal operating temperatures only with difficulty, so that it may happen that when starting, many of the parts to be lubricated are not at all or insufficiently lubricated, thus considerable damage to the engine may be caused. It has already been proposed for this reason to provide additional lubricating devices for certain parts, e. g. for the cylinder running surfaces which after starting supply the particularly endangered parts with oil until the latter has reached its normal operating temperature. These additional lubricating devices are in this case in connection with the main supply pipe by thermostatically controlled valves.

It is an object of this invention to render unnecessary these additional lubricant supply passages provided only for especially endangered parts, and to provide means which supply all parts to be lubricated wtih a proper quantity of oil immediately after starting. According to the invention the oil in the supply means is submitted to a considerable increased pressure. This increased pressure reliably cares for the supply of all parts to be lubricated with oil immediately after starting, even though the oil is still cold and viscous, without special additional supply means for certain endangered parts being forced to enter in action. To increase the oil pressure, a pressure control valve with additional valve spring stressing can be utilised, which is located in the supply pipe or in a particular pressure chamber. In the lastmentioned case, the pump and pressure chamber form a self-contained unit, which may be utilised for different engine types without the necessity of any modification of the lubricating device of the type of engine in question. For this purpose the pressure control valve is designed so that the lower end of the pressure spring abuts in a piston valve which, if displaced under hydraulic pressure, imparts additional stressing to the spring. Preferably oil of the pressure chamber is utilised as pressure liquid, which pressure chamber is continuously supplied with oil by a delivery pump, the oil being lead below the piston valve through a passage and an opening which can be closed. As the cross-sectional area of the piston valve under oil pressure is larger than that of the pressure control valve, the oil pressure will move the larger piston valve upwardly, thus additionally stressing the spring until the desired spring compression is obtained, e. g. by abutting against a collar. The entrance of the pressure oil to the passage and the piston valve is in this case controlled by a slide valve which with a cold engine either uncovers the opening, so that the oil under pressure, immediately after starting, can flow below the piston valve thus displacing it, or covers this opening when the oil has reached its normal operating temperature, so that now the oil is led under normal operating pressure to all parts to be lubricated. The pressure desired in any case, i. e. for starting or during operation, may be adjusted by means of abutments, adjusting screws or the like.

One embodiment of the invention is illustrated in vertical section in the single figure in the drawing.

Oil is pressed into an oil pressure chamber 1 by means of a delivery pump (not shown) of any type. The pressure is controlled by a pressure control valve 2 which is pressed by spiral springs 3 against the seat 4. If the pressure of the spiral spring 3 is exceeded, the valve is lifted and the oil flows under the desired pressure to the space 5 and from there to the parts in question to be lubricated. According to the invention the pressure in the oil pressure chamber 1 is to be increased so that after starting the cold and viscous oil can reach all parts in question. This is obtained by abutting the spiral spring 3 with its lower end against a movable abutment 6, which under the action of the pressure liquid in a second chamber is pressed upwardly, thus increasing the tension of the spring 3 above the normal amount, until in the pressure chamber 1 the desired increased pressure necessary for starting conditions is reached. If this is the case, the valve 2 opens and the oil now can flow under increased pressure to all parts to be desired to be lubricated. As already mentioned the stressing of the spring of the pressure control valve 2 is controlled by a pressure liquid, for which in the illustrated example the pressure oil is drawn from the chamber 1. This pressure oil is led through the opening 8 and the passage 7 to the side 9 of the movable abutment 6, which is away from the spring 3. As the cross-sectional area under oil pressure of the piston valve 6 is larger than that of the valve 2, with increased pressure above the operating pressure, the valve is pressed more tightly against its seat 4 by the additional stressing of the spring than with high operating temperatures of the oil, under the influence of the upwardly moving movable abutment 6. The desired spring stressing for the normal operating pressure can be regulated by adjusting screws 10. For the starting pressure a stop 11 is provided for limiting the compression of the spring.

The opening 8 of the passage 7 can be fully or partly uncovered or covered by a slide valve 12, the movements of which are controlled by a thermostat 13. If the oil, when starting the engine is cold and viscous, the slide valve 12 has in the position shown completely uncovered the opening 8. The oil once having reached its normal operating temperature the thermostat moves the slide valve 12 into a position in which the opening 8 is covered.

The mode of operation of the new lubricating device is as follows:

When the engine is cold the oil surrounded thermostat is contracted and moves the slide valve 12 into the position illustrated, so that the opening 8 is completely uncovered. When starting the engine, pressure oil is pressed by the delivery pump into the pressure chamber and therefrom through the opening 8 and the passage 7 into a second chamber below the movable abutment 6, the cross-sectional area of which, exposed to the oil pressure, is larger than that of the valve 2, so that the spring 3 is additionally stressed. Owing to the delivery of the oil pump into the pressure chamber 1 the pressure therein will continuously increase until it has reached the desired amount, sufficient to deliver all parts to be lubricated with cold and viscous oil. The increasing oil temperature is imparted to the thermostat 13 which consequently will expand and causes the valve 12 to gradually cover the opening 8. This will prevent the pressure oil from acting upon the movable abutment, the spiral spring will be unstressed and the pressure in the pressure chamber and in the passages now is reduced to the desired operating pressure as adjusted.

As already initially stated it is an essential point of this invention, that when starting the engine the oil pressure in the pipes leading to the parts to be lubricated, or in a special pressure chamber, is increased manually or automatically by any appropriate means to such an extent that the cold and viscous oil is forced to all parts to be lubricated. The increase of the pressure by an additional loading of a pressure control valve or the like can be effected automatically (as illustrated) or manually.

A further characteristic of the invention is the fact that the oil pump and pressure chamber can be utilised as self-contained unit for engines of different types without the necessity of any modification or special constructional measures in the engines themselves as contrasted with the known lubricating devices.

It will be seen therefore that I have provided a device which fulfills the objects primarily stated, and while I have shown a single embodiment of my invention, it is clear that other forms thereof may readily be provided without departing from my invention as defined in the claims which follow.

I claim:

1. In a lubricating system, in combination, a first pressure chamber, a delivery conduit leading to points to be lubricated, a valve subject to the pressure within said chamber for controlling the flow of lubricant from said chamber to said conduit, spring means acting at one end upon said valve for opposing the pressure within said chamber, a second chamber, a movable abutment in said second chamber for the other end of said spring means, and means responsive to the temperature of said lubricant for controlling the flow of lubricant to said second chamber for moving said abutment.

2. The combination according to claim 1, in combination with adjustable means for limiting the motion of said movable abutment in one direction.

3. The combination according to claim 1, in combination with means for limiting the motion of said movable abutment in both directions.

4. The combination according to claim 1, in which said movable abutment is a piston, and said last means includes a second valve for controlling the flow of said fluid from said first chamber upon said piston in said second chamber, and a thermo-responsive device responsive to the temperature of the lubricant in said first chamber for controlling said second valve.

5. The combination according to claim 1, in which said movable abutment is a piston having a larger cross-sectional area than said valve, and said last means includes a second valve for controlling the flow of lubricant from said first chamber upon said piston in said second chamber, and a thermo-responsive device responsive to the temperature of lubricant in said first chamber for controlling said second valve.

6. The combination according to claim 1, in which said last means causes said abutment to move toward said valve to compress said spring when said lubricant is cold.

7. The combination according to claim 1, in combination with means for limiting the motion of said movable abutment in both directions, and means for adjusting one of said motion-limiting means.

MARTIN DUCKSTEIN.